(12) United States Patent
Gao

(10) Patent No.: US 12,225,110 B2
(45) Date of Patent: Feb. 11, 2025

(54) KEY MANAGEMENT SYSTEM

(71) Applicant: INSPUR SUZHOU INTELLIGENT TECHNOLOGY CO., LTD., Jiangsu (CN)

(72) Inventor: Guanghui Gao, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 178 days.

(21) Appl. No.: 18/015,801

(22) PCT Filed: May 27, 2021

(86) PCT No.: PCT/CN2021/096545
§ 371 (c)(1),
(2) Date: Jan. 12, 2023

(87) PCT Pub. No.: WO2022/033122
PCT Pub. Date: Feb. 17, 2022

(65) Prior Publication Data
US 2023/0275747 A1 Aug. 31, 2023

(30) Foreign Application Priority Data
Aug. 14, 2020 (CN) .......................... 202010819554.X

(51) Int. Cl.
*H04L 9/08* (2006.01)

(52) U.S. Cl.
CPC .......... *H04L 9/0822* (2013.01); *H04L 9/0852* (2013.01)

(58) Field of Classification Search
CPC ..... H04L 9/0822; H04L 9/0852; H04L 9/083; H04L 9/0861; H04L 9/14; H04L 9/0855
See application file for complete search history.

(56) References Cited

U.S. PATENT DOCUMENTS

2012/0177201 A1* 7/2012 Ayling ................ H04L 9/0858
380/278
2013/0083926 A1* 4/2013 Hughes ................ H04L 9/3247
380/278
(Continued)

FOREIGN PATENT DOCUMENTS

| CN | 105827397 A | 8/2016 |
| CN | 106899407 A | 6/2017 |

(Continued)

OTHER PUBLICATIONS

Corresponding International Patent Application No. PCT/CN2021/096545, International Search Report, Date Mailed Aug. 13, 2021.
(Continued)

*Primary Examiner* — Abiy Getachew
(74) *Attorney, Agent, or Firm* — Cooper Legal Group, LLC

(57) ABSTRACT

A key management system is disclosed, including: a control node; multiple computing nodes, all the multiple computing nodes are connected to the control node; and multiple Quantum Key Distribution (QKD) nodes, all the multiple QKD nodes are connected to the control node, and each QKD node is connected to one of the computing nodes, where each QKD node is configured to generate a root key, generate Key Encryption Keys (KEKs) between the QKD node and a plurality of other QKD nodes according to a first instruction sent by the control node, and generate, according to a second instruction sent by the control node, a Data Encryption Key (DEK) corresponding to a user on the computing node connected to the QKD node.

10 Claims, 2 Drawing Sheets

(56) References Cited

U.S. PATENT DOCUMENTS

| | | | |
|---|---|---|---|
| 2019/0394031 A1* | 12/2019 | Deng | H04L 9/0852 |
| 2021/0044433 A1* | 2/2021 | Hay | H04L 9/0855 |
| 2023/0027422 A1* | 1/2023 | Hines, III | H04L 9/0662 |

FOREIGN PATENT DOCUMENTS

| | | |
|---|---|---|
| CN | 110650011 A | 1/2020 |
| CN | 111385085 A | 7/2020 |
| CN | 111953487 A | 11/2020 |

OTHER PUBLICATIONS

Corresponding International Patent Application No. PCT/CN2021/096545, Written Opinion, Date Mailed Aug. 13, 2021.
Corresponding Chinese Patent Application No. 202010819554.X, First Office Action, dated Aug. 26, 2021.

* cited by examiner

KEY MANAGEMENT SYSTEM

This application claims priority to Chinese Patent Application No. 202010819554.X, filed on Aug. 14, 2020, in China National Intellectual Property Administration and entitled "Key Management System", the contents of which are hereby incorporated by reference in its entirety.

FIELD

The present disclosure relates to the field of key management, and particularly to a key management system.

BACKGROUND

As shown in FIG. 1, a deployment architecture of traditional OpenStack (an open source cloud computing management platform project) may include a control node, m computing nodes, and n storage nodes. In OpenStack, a large number of keys may be used, such as a login password, a certificate, a key pair, encryption of a cloud disk, file encryption, image encryption, log encryption, and encryption for data transmission. As an encryption component in OpenStack, Barbican implements life cycle management of symmetric keys, asymmetric keys, certificates, and original binary data, northbound plugin design supports different software and Hardware Security Module (HSM) cryptographic devices, and southbound Application Programming Interface (API) provides key management service for the other components of OpenStack.

At present, when data transmission is needed between cross-node users, the deployment architecture of traditional OpenStack implements data protection mainly by envelope encryption, which is encryption means like a digital envelope technology. This technology combines symmetric key and asymmetric key technologies to encrypt a symmetric Data Encryption Key (DEK) for encrypting data by use of a public key and then pack a DEK ciphertext and a data ciphertext in an envelope together for storage, transmission, and use. Since envelope encryption is required to transmit a DEK ciphertext and a data ciphertext together in a service network layer, with the improvement of computing power, particularly the development of quantum computers, the data ciphertext may be decrypted only by cracking the DEK ciphertext. Therefore, it is unlikely to ensure the security of the data ciphertext.

SUMMARY

In order to solve at least one of the foregoing problems, embodiments of the present disclosure propose a key management system, including:
a control node;
multiple computing nodes, all of the multiple computing nodes are connected to the control node; and
multiple Quantum Key Distribution (QKD) nodes, all of the multiple QKD nodes are connected to the control node, and each of the multiple QKD nodes is connected to one of the multiple computing nodes.

Each of the multiple QKD nodes is configured to generate a root key, generate Key Encryption Keys (KEKs) between the QKD node and a plurality of other QKD nodes according to a first instruction sent by the control node, and generate, according to a second instruction sent by the control node, a DEK corresponding to a user on the one of the multiple computing nodes connected to the QKD node.

In some embodiments, each of the multiple QKD nodes is further configured to:
send the KEKs to the corresponding plurality of other QKD nodes such that the corresponding plurality of other QKD nodes encrypt the KEKs with own root keys; and
encrypt the KEKs between the QKD node and the plurality of other QKD nodes with the root key respectively.

In some embodiments, each of the multiple computing nodes is configured to, in response to receiving a request of a user for a DEK between the user and a user on another computing node, send the request to the control node.

The control node is configured to, in response to receiving the request, send the second instruction to the QKD node connected to the one of the multiple computing nodes that sends the request.

In some embodiments, the QKD node connected to the one of the multiple computing nodes that sends the request is configured to:
generate the DEK between the user and the user on the another computing node in response to receiving the second instruction;
send the DEK between the user and the user on the another computing node to another QKD node connected to the another computing node;
decrypt an encrypted KEK between the QKD node and the another QKD node with the root key; and
encrypt the DEK between the user and the user on the another computing node with the decrypted KEK.

In some embodiments, the QKD node is further configured to delete the unencrypted KEK and the unencrypted DEK.

In some embodiments, the another QKD node is further configured to, in response to receiving the DEK, decrypt the encrypted KEK between the another QKD node and the QKD node with the corresponding root key, and encrypt the received DEK with the decrypted KEK.

In some embodiments, each of the multiple computing nodes is configured to, in response to receiving plaintext data to be transmitted sent by the user to the user on the another computing node, send the plaintext data to be transmitted to the QKD node connected to the one of the multiple computing nodes.

The QKD node is configured to, in response to receiving the plaintext data to be transmitted, decrypt, with the root key, the encrypted KEK between the QKD node and the another QKD node connected to the another computing node, decrypt the encrypted DEK between the user and the user on the another computing node with the decrypted KEK, encrypt the plaintext data to be transmitted with the decrypted DEK to obtain ciphertext data to be transmitted, and return the ciphertext data to be transmitted to the computing node.

In some embodiments, each of the multiple computing nodes is configured to, in response to receiving the ciphertext data to be transmitted, send the ciphertext data to be transmitted to the another computing node.

In some embodiments, the another computing node is configured to, in response to receiving the ciphertext data sent by the user to the user on the another computing node, send the ciphertext data to the another QKD node connected to the another computing node.

The another QKD node is configured to, in response to receiving the ciphertext data, decrypt, with the root key, the encrypted KEK between the another QKD node and the QKD node connected to the one of the multiple computing nodes, decrypt the encrypted DEK between the user and the user on the another computing node with the decrypted KEK, decrypt the ciphertext data with the decrypted DEK to obtain the plaintext data sent by the user to the user on the another computing node, and return the plaintext data to the another computing node.

In some embodiments, each of the multiple QKD nodes is directly connected with one of the multiple computing nodes through a physical medium.

The present disclosure has one of the following beneficial technical effects. Compared with a deployment architecture of traditional OpenStack, the quantum-key-based key management system proposed in the present disclosure adds a key distribution plane; and in addition, the number of QKD nodes changes from one to the same number as the computing nodes, and the QKD nodes are connected to the corresponding computing nodes. Unencrypted and decrypted plaintext data is transmitted between the computing nodes and the QKD nodes, whereby transmission of the plaintext data on a management plane and a service plane is avoided, and the security is improved.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other embodiments according to these drawings without creative work.

DETAILED DESCRIPTION

In order to make the objective, technical solutions, and advantages of the present disclosure clearer, the embodiments of the present disclosure will further be described below in detail in combination with specific embodiments and with reference to the drawings.

It is to be noted that all expressions made with "first", "second", etc., in the embodiments of the present disclosure are for distinguishing two different entities or parameters with the same name, and thus it can be seen that "first" and "second" are only for ease of description and should not be understood as limitations on the embodiments of the present disclosure. No descriptions are made thereto in the following embodiments.

It is to be noted that in the embodiments of the present disclosure, a quantum key is a symmetric key generated by QKD based on characteristics of quantum mechanics, which has been proved to be physically absolutely secure, with its security ensured by the "Heisenberg's uncertainty principle" and "quantum no-cloning theorem" in physics.

DEK is a key for encrypting user data.

KEK is a key for encrypting a DEK.

Root key, i.e., Media KEK (MKEK), is a key for encrypting a KEK.

Barbican is an official project of the OpenStack community, which provides a key management function for any environment including cloud service.

HSM is a sort of hardware device that implements security production, storage, management and use of keys and provides encryption processing service.

Figure 1:
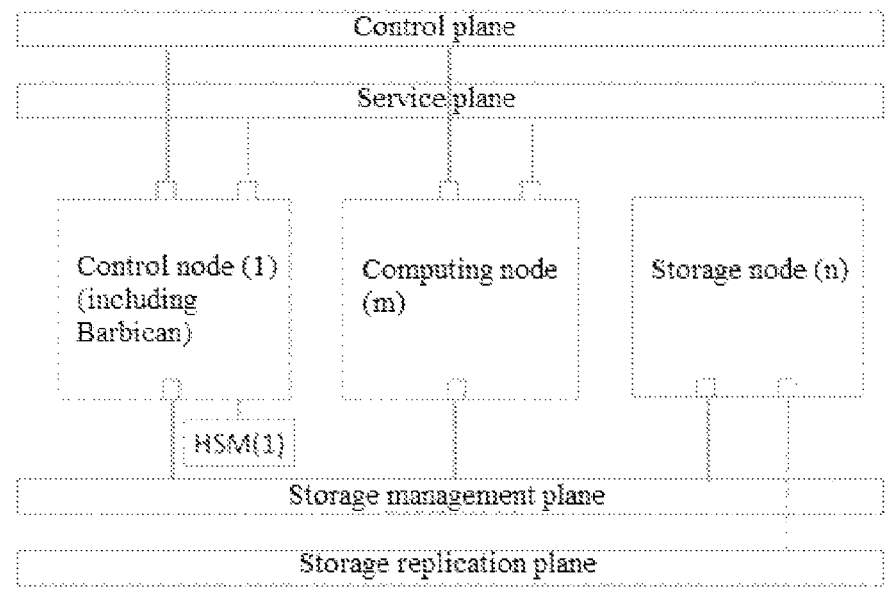
FIG. 1 is a schematic structural diagram of OpenStack according to the prior art.
Figure 2:
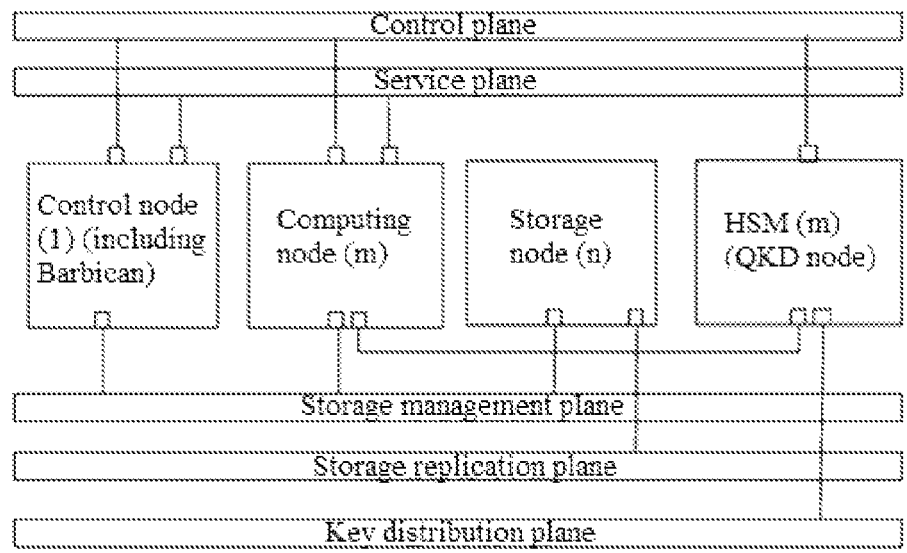
FIG. 2 is a schematic structural diagram of a key management system according to an embodiment of the present disclosure.

According to an aspect of the present disclosure, an embodiment of the present disclosure proposes a key management system, which, as shown in FIG. 2, may include:
a control node;
multiple computing nodes, all of the multiple computing nodes are connected to the control node; and
multiple QKD nodes, all of the multiple QKD nodes are connected to the control node, and each of the multiple QKD nodes is connected to one of the multiple computing nodes.

Each of the multiple QKD nodes is configured to generate a root key, generate KEKs between the QKD node and a plurality of other QKD nodes according to a first instruction sent by the control node, and generate, according to a second instruction sent by the control node, a DEK corresponding to a user on the one of the multiple computing nodes connected to the QKD node.

Compared with a deployment architecture of traditional OpenStack, the quantum-key-based key management system proposed in the present disclosure adds a key distribution plane; and in addition, the number of QKD nodes changes from one to the same number as the computing nodes, and the QKD nodes are connected to the corresponding computing nodes. Unencrypted and decrypted plaintext data is transmitted between the computing nodes and the QKD nodes, whereby transmission of the plaintext data on a management plane and a service plane is avoided, and the security is improved.

In some embodiments, each of the multiple QKD nodes is further configured to:
send the KEKs to the corresponding plurality of other QKD nodes such that the corresponding plurality of other QKD nodes encrypt the KEKs with own root keys; and
encrypt the KEKs between the QKD node and the plurality of other QKD nodes with the root key respectively.

In some embodiments, each of the multiple computing nodes is configured to, in response to receiving a request of a user for a DEK between the user and a user on another computing node, send the request to the control node.

The control node is configured to, in response to receiving the request, send the second instruction to the QKD node connected to the one of the multiple computing nodes that sends the request.

In some embodiments, the QKD node connected to the one of the multiple computing nodes that sends the request is configured to:
generate the DEK between the user and the user on the another computing node in response to receiving the second instruction;
send the DEK between the user and the user on the another computing node to another QKD node connected to the another computing node;
decrypt an encrypted KEK between the QKD node and the another QKD node with the root key; and
encrypt the DEK between the user and the user on the another computing node with the decrypted KEK.

In some embodiments, the QKD node is further configured to delete the unencrypted KEK and the unencrypted DEK.

In some embodiments, the another QKD node is further configured to, in response to receiving the DEK, decrypt the encrypted KEK between the another QKD node and the QKD node with the corresponding root key, and encrypt the received DEK with the decrypted KEK.

In some embodiments, each of the multiple computing nodes is configured to, in response to receiving plaintext data to be transmitted sent by the user to the user on the another computing node, send the plaintext data to be transmitted to the QKD node connected to the one of the multiple computing nodes.

The QKD node is configured to, in response to receiving the plaintext data to be transmitted, decrypt, with the root key, the encrypted KEK between the QKD node and the another QKD node connected to the another computing node, decrypt the encrypted DEK between the user and the user on the another computing node with the decrypted KEK, encrypt the plaintext data to be transmitted with the decrypted DEK to obtain ciphertext data to be transmitted, and return the ciphertext data to be transmitted to the computing node.

In some embodiments, each of the multiple computing nodes is configured to, in response to receiving the ciphertext data to be transmitted, send the ciphertext data to be transmitted to the another computing node.

In some embodiments, the another computing node is configured to, in response to receiving the ciphertext data sent by the user to the user on the another computing node, send the ciphertext data to the another QKD node connected to the another computing node.

Another quantum key distribution node is configured to, in response to receiving the ciphertext data, decrypt, with the root key, the encrypted key encryption key between the another quantum key distribution node and the quantum key distribution node connected to the one of the multiple computing nodes, decrypt the encrypted data encryption key between the user and the user on the another computing node with the decrypted key encryption key, decrypt the ciphertext data with the decrypted data encryption key to obtain the plaintext data sent by the user to the user on the another computing node, and return the plaintext data to the another computing node.

How the key management system proposed in the present disclosure performs data transmission will now be described in detail in combination with FIG. 3 and a certain example.

Figure 3:
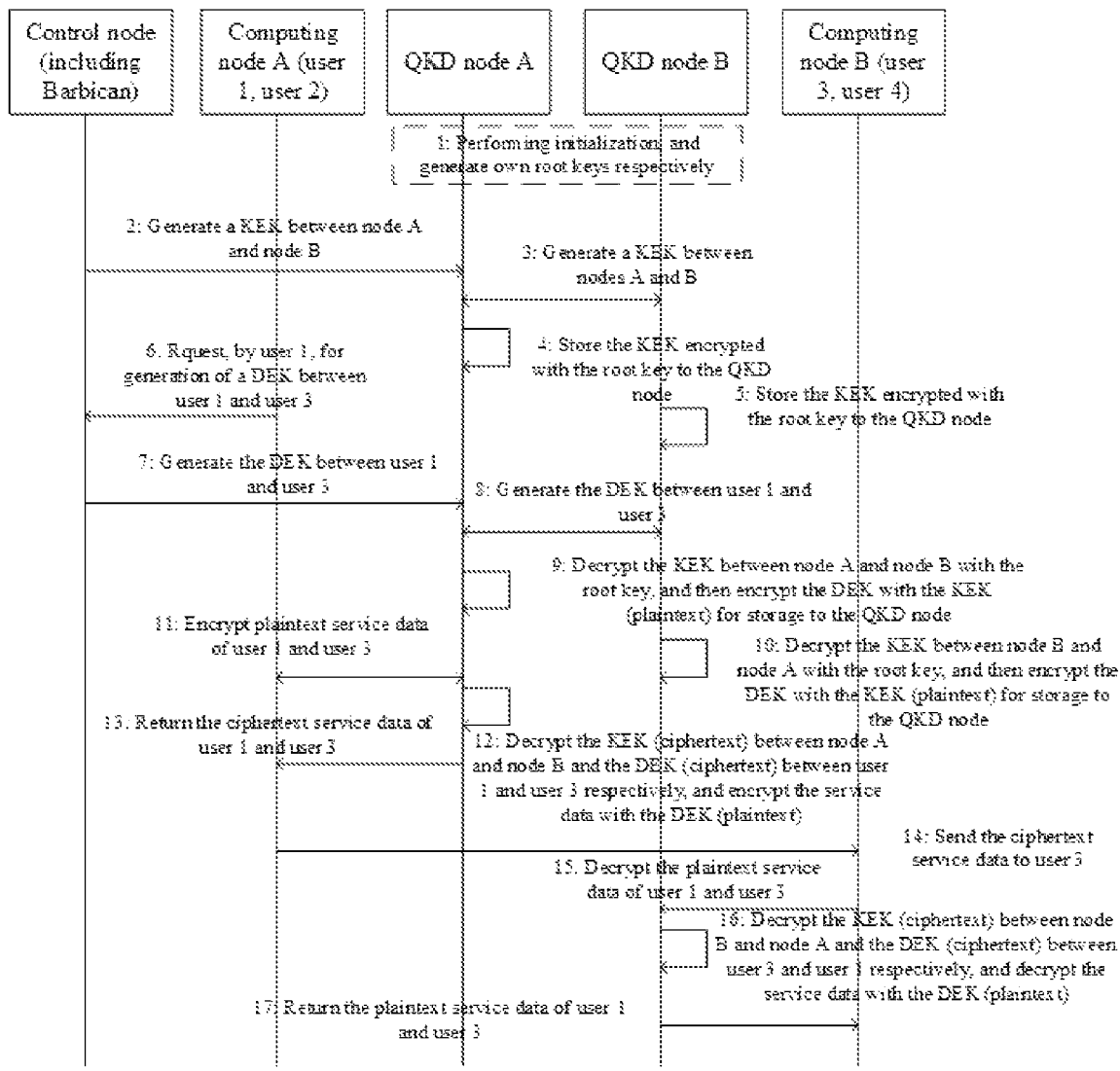
FIG. 3 is a sequence diagram of cross-node data transmission according to an embodiment of the present disclosure.

As shown in FIG. 3, in the present embodiment, the system includes a control node, two computing nodes (computing nodes A and B), and two QKD nodes (QKD nodes A and B). There are user 1 and user 2 on computing node A and user 3 and user 4 on computing node B.

Taking encrypted data transmission between user 1 on computing node A and user 3 on computing node B as an example, a key distribution process is as follows.

Initialization is performed, and QKD node A and QKD node B generate their own root keys respectively.

The control node issues a first instruction of generating a KEK between QKD node A and QKD node B to QKD node A.

QKD node A and QKD node B generate symmetric KEKs by a QKD technology.

QKD node A encrypts the KEK between QKD node A and QKD node B with the root key, and stores the KEK (ciphertext) between QKD node A and QKD node B. QKD node B encrypts the KEK between QKD node B and QKD node A with the root key, and stores the KEK (ciphertext) between QKD node B and QKD node A.

User 1 requests the control node for generating a DEK between user 1 and user 3.

The control node issues a second instruction of generating the DEK between user 1 and user 3 on computing node B to QKD node A (namely to the QKD node connected to computing node A that sends the request).

QKD node A generates the symmetric DEK between user 1 and user 3 by the QKD technology, and sends the symmetric DEK between user 1 and user 3 to QKD node B. Meanwhile, QKD node A decrypts the encrypted KEK between QKD node A and QKD node B with its own root key, thereby encrypting the DEK between user 1 and user 3 with the decrypted KEK. After decryption, the unencrypted KEK and the unencrypted DEK are deleted.

QKD node B receives the DEK between user 1 and user 3, decrypts the encrypted KEK between QKD node B and QKD node A with its own root key, and encrypts the received DEK with the decrypted KEK. Similarly, after decryption, the unencrypted KEK and the unencrypted DEK are deleted.

When user 1 needs to send data to user 3, user 1 (computing node A) sends plaintext service data of user 1 and user 3 to QKD node A.

QKD node A obtains the KEK (ciphertext) between QKD node A and QKD node B and the DEK (ciphertext) between user 1 and user 3, first decrypts the KEK between QKD node A and QKD node B with the root key, then decrypts the DEK between user 1 and user 3 with the KEK (plaintext) between QKD node A and QKD node B, and encrypts the plaintext service data with the DEK (plaintext) between user 1 and user 3. Similarly, after decryption, the unencrypted KEK and the unencrypted DEK are deleted.

QKD node A returns the service data (ciphertext) with user 3 to user 1 (computing node A).

User 1 sends service data (ciphertext) to user 3 on computing node B through computing node A.

User 3 on computing node B sends the ciphertext service data of user 1 and user 3 to QKD node B.

QKD node B obtains the KEK (ciphertext) between QKD node B and QKD node A and the DEK (ciphertext) between user 1 and user 3, decrypts the KEK between QKD node B and QKD node A with the root key, then decrypts the DEK between user 1 and user 3 with the KEK (plaintext) between QKD node B and QKD node A, and decrypts the ciphertext service data with the DEK (plaintext) between user 1 and user 3. Similarly, after decryption, the unencrypted KEK and the unencrypted DEK are deleted.

QKD node B returns the service data (plaintext) with user 1 to user 3, and after succeeding, deletes the unencrypted service data.

In some embodiments, each of the multiple QKD nodes is directly connected with one of the multiple computing nodes through a physical medium.

Figure 4:
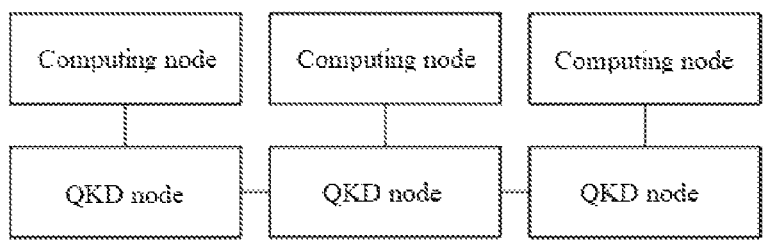
FIG. 4 is a schematic connection diagram of QKD nodes and computing nodes according to an embodiment of the present disclosure.

As shown in FIG. 4 each of the multiple QKD nodes may be directly connected with one of the multiple computing nodes, and different QKD nodes may be mutually connected by optical fibers. Therefore, transmission of unencrypted and decrypted plaintext data in a management network and a service network may be avoided, and the security is improved.

Compared with a deployment architecture of traditional OpenStack, the quantum-key-based key management system proposed in the present disclosure adds a key distribution plane; and in addition, the number of QKD nodes changes from one to the same number as the computing nodes, and the QKD nodes are connected to the corresponding computing nodes. Unencrypted and decrypted plaintext data is transmitted between the computing nodes and the QKD nodes, whereby transmission of the plaintext data on a management plane and a service plane is avoided, and the security is improved. Moreover, user-granularity-based key management is implemented by correspondence of KEKs and DEKs to nodes and users respectively.

It is also understood by those skilled in the art that various exemplary logic blocks, modules, circuits, and algorithm steps described in combination with the disclosure herein may be implemented as electronic hardware, computer software, or a combination thereof. For ease of description about such interchangeability of hardware and software, functions of various schematic components, blocks, modules, circuits, and steps are described generally. Whether these functions are realized as software or hardware depends on specific applications and design constraints on the whole system. Those skilled in the art may realize the functions for each specific application in various manners, but such realization should not be explained as resulting in departure from the scope disclosed in the embodiment of the present disclosure.

The above is the exemplary embodiment disclosed in the present disclosure. However, it is to be noted that various variations and modifications may be made without departing from the scope defined in the claims and disclosed in the embodiments of the present disclosure. The functions, steps, and/or actions in the method claims according to the disclosed embodiments described herein are not required to be executed in any specific sequence. In addition, the element disclosed in the embodiments of the present disclosure may be described or required in an individual form, but may be understood as a plural form, unless clearly limited to a singular form.

It is to be understood that, as used herein, the singular form "a/an" is intended to include the plural form also, unless exceptional cases are supported clearly in the context. It is also to be understood that "and/or" used herein refers to including any or all possible combinations of one or more than one item that is listed associatively.

The sequence numbers of the embodiments of the present disclosure are only for description and do not represent superiority-inferiority of the embodiments.

It can be understood by those ordinarily skilled in the art that all or part of the steps of the above-mentioned embodiments may be completed by hardware, or by a program by instructing related hardware. The program may be stored in a computer-readable storage medium. The above-mentioned storage medium may be a read-only memory, a magnetic disk, an optical disk, or the like.

It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

What is claimed is:

1. A key management system, comprising:
a control node;
multiple computing nodes, all of the multiple computing nodes are connected to the control node; and
multiple Quantum Key Distribution (QKD) nodes, all of the multiple QKD nodes are connected to the control node, and each of the multiple QKD nodes is connected to one of the multiple computing nodes,
wherein each of the multiple QKD nodes is configured to generate a root key, generate Key Encryption Keys (KEKs) between the QKD node and a plurality of other QKD nodes according to a first instruction sent by the control node, and generate, according to a second instruction sent by the control node, a Data Encryption Key (DEK) corresponding to a user on the one of the multiple computing nodes connected to the QKD node;
wherein each of the multiple OKD nodes is further configured to send the KEKs to the corresponding plurality of other QKD nodes such that the corresponding plurality of other QKD nodes encrypt the KEKs with own root keys;
wherein each of the multiple computing nodes is configured to, in response to receiving a request of the user for a DEK between the user and a second user on a further computing node, send the request to the control node;
wherein the QKD node connected to the one of the multiple computing nodes that sent the request is configured to generate the DEK between the user and the second user on the further computing node in response to receiving the second instruction;
wherein the OKD node is further configured to delete an unencrypted KEK and an unencrypted DEK;
wherein each of the multiple computing nodes is further configured to, in response to receiving plaintext data to be transmitted sent by the user to the second user on the further computing node, send the plaintext data to be transmitted to the QKD node connected to the one of the multiple computing nodes; and
wherein the OKD node is further configured to, in response to receiving the plaintext data to be transmitted, decrypt, with the root key, an encrypted KEK between the QKD node and a further QKD node connected to the further computing node to yield a decrypted KEK, decrypt an encrypted DEK between the user and the second user on the further computing node with the decrypted KEK to yield a decrypted DEK, encrypt the plaintext data to be transmitted with the decrypted DEK to obtain ciphertext data to be transmitted, and return the ciphertext data to be transmitted to the computing node.

2. The system according to claim 1, wherein the further QKD node is configured to, in response to receiving the DEK, decrypt an encrypted KEK between the further QKD node and the QKD node with the corresponding root key to yield a second decrypted KEK, and encrypt the received DEK with the second decrypted KEK.

3. The system according to claim 1, wherein each of the multiple computing nodes is further configured to, in response to receiving the ciphertext data to be transmitted, send the ciphertext data to be transmitted to the further computing node.

4. The system according to claim 3, wherein the further computing node is configured to, in response to receiving the ciphertext data sent by the user to the second user on the further computing node, send the ciphertext data to the further QKD node connected to the further computing node.

5. The system according to claim 1, wherein each of the multiple QKD nodes is directly connected with one of the multiple computing nodes through a physical medium.

6. The system according to claim 1, wherein each of the multiple QKD nodes is further configured to:
- encrypt the KEKs between the QKD node and the plurality of other QKD nodes with the root key respectively.

7. The system according to claim 1, wherein the control node is configured to, in response to receiving the request, send the second instruction to the QKD node connected to the one of the multiple computing nodes that sends the request.

8. The system according to claim 1, wherein the QKD node connected to the one of the multiple computing nodes that sent the request is configured to:
- send the DEK between the user and the second user on the further computing node to the further QKD node connected to the further computing node.

9. The system according to claim 1, wherein the QKD node connected to the one of the multiple computing nodes that sent the request is configured to:
- encrypt the DEK between the user and the second user on the further computing node with the decrypted KEK.

10. The system according to claim 4, wherein the further QKD node is further configured to, in response to receiving the ciphertext data, decrypt, with the root key, decrypt the ciphertext data with the decrypted DEK to obtain the plaintext data sent by the user to the second user on the further computing node, and return the plaintext data to the further computing node.

* * * * *